(12) United States Patent
Kudo

(10) Patent No.: US 11,763,435 B2
(45) Date of Patent: *Sep. 19, 2023

(54) PERSON VERIFICATION DEVICE AND METHOD AND NON-TRANSITORY COMPUTER READABLE MEDIA

(71) Applicant: NEC Corporation, Tokyo (JP)

(72) Inventor: Yuta Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,515

(22) Filed: Feb. 10, 2022

(65) Prior Publication Data

US 2022/0222977 A1 Jul. 14, 2022

Related U.S. Application Data

(63) Continuation of application No. 16/770,359, filed as application No. PCT/JP2018/038673 on Oct. 17, 2018, now Pat. No. 11,495,057.

(30) Foreign Application Priority Data

Dec. 8, 2017 (JP) .................................. 2017-236304

(51) Int. Cl.
*G06T 7/00* (2017.01)
*G06T 7/77* (2017.01)
(Continued)

(52) U.S. Cl.
CPC .............. *G06T 7/00* (2013.01); *G06F 18/214* (2023.01); *G06T 7/77* (2017.01); *G06V 10/454* (2022.01);
(Continued)

(58) Field of Classification Search
CPC ..................... G06F 18/214; G06T 7/77; G06T 2207/20076; G06T 2207/20081; G06T 2207/30196
(Continued)

(56) References Cited

U.S. PATENT DOCUMENTS

| 11,495,057 B2 * | 11/2022 | Kudo ..................... G06V 40/10 |
| 2007/0183633 A1 | 8/2007 | Hoffmann .......... G06K 9/00221 382/116 |

(Continued)

FOREIGN PATENT DOCUMENTS

| JP | 2004-046567 A | 2/2004 |
| JP | 2005-351814 A | 12/2005 |

(Continued)

OTHER PUBLICATIONS

International Search Report for PCT/JP2018/038673 dated Nov. 27, 2018 [PCT/ISA/210].

(Continued)

*Primary Examiner* — Ayodeji O Ayotunde

(57) ABSTRACT

A weight estimation unit estimates, from a person's image in which a person is included, a weight of a human body part of the person in accordance with an existence probability of the human body part of the person. A feature creation unit creates a feature for verification based on a weight of the person's image and a weight estimated by the weight estimation unit. A verification feature storage unit stores a feature of the person who is the object of verification as a verification feature. A person verification unit compares the feature for verification created by the feature creation unit and the verification feature stored in the verification feature storage unit.

11 Claims, 10 Drawing Sheets

(51) Int. Cl.
*G06V 40/70* (2022.01)
*G06V 40/10* (2022.01)
*G06F 18/214* (2023.01)
*G06V 10/764* (2022.01)
*G06V 10/82* (2022.01)
*G06V 10/44* (2022.01)

(52) U.S. Cl.
CPC ............ *G06V 10/764* (2022.01); *G06V 10/82* (2022.01); *G06V 40/10* (2022.01); *G06V 40/103* (2022.01); *G06V 40/70* (2022.01); *G06T 2207/20076* (2013.01); *G06T 2207/20081* (2013.01); *G06T 2207/20084* (2013.01); *G06T 2207/30196* (2013.01)

(58) Field of Classification Search
USPC ......................................................... 382/124
See application file for complete search history.

(56) References Cited

U.S. PATENT DOCUMENTS

| | | | |
|---|---|---|---|
| 2008/0273761 A1 | 11/2008 | Kawata | G06K 9/6271 382/115 |
| 2009/0080711 A1 | 3/2009 | Yokoi et al. | |
| 2016/0261793 A1 | 9/2016 | Sivan | H04N 19/597 |
| 2018/0012107 A1 | 1/2018 | Xu et al. | |

FOREIGN PATENT DOCUMENTS

| | | |
|---|---|---|
| JP | 2007-025902 A | 2/2007 |
| JP | 2009-075868 A | 4/2009 |
| JP | 2011-165170 A | 8/2011 |
| JP | 2011-232845 A | 11/2011 |
| JP | 2013-188546 A | 9/2013 |
| JP | 2014-178862 A | 9/2014 |
| JP | 2017-045341 A | 3/2017 |
| JP | 2017-062781 A | 3/2017 |
| JP | 2017062633 A | 3/2017 |
| JP | 2017-097578 A | 6/2017 |
| JP | 2017-138608 A | 8/2017 |

OTHER PUBLICATIONS

Written Opinion for PCT/JP2018/038673 dated Nov. 27, 2018 [PCT/ISA/237].
Japanese Office Action for JP Application No. 2021-097037 dated May 31, 2022 with English Translation.
Yakura Hiromu 4 others, "Analysis method of malware imaged by CNN and the attention mechanism", Journal of computer Security Symposium 2017, General Incorporated Information Processing Society, Oct. 16, 2017, vol. 2017, No. 2, pp. 1381-1388 Cited in JPOA as documents showing well-known arts.
Qi Chu et al., "Online Multi-object Tracking Using CNN-Based Single Object Tracker with Spatial-Temporal Attention Mechanism", 2017 IEEE International Conference on Computer Vision (ICCV), Oct. 22, 2017, pp. 4846-4855.
Zbigniew Wojna et al., "Attention-Based Extraction of Structured Information from Street View Imagery", 2017 14th IAPR International Conference on Document Analysis and Recognition (ICDAR), Nov. 9, 2017, pp. 844-850.
Tao Zhou et al., "Attention-Based Natural Language Person Retrieval", 2017 IEEE Conference on Computer Vision and Pattern Recognition Workshops (CVPRW), Jul. 21, 2017, pp. 27-34.
Dongbin Zhao et al., "Deep Reinforcement Learning With Visual Attention for Vehicle Classification", IEEE Transactions on Cognitive and Developmental Systems, Sep. 30, 2016, vol. 9, No. 4, pp. 356-367.
Kinoshita Koichi, Murase Hiroshi, "the body detection robust far hiding by multistage integration of a part score map", an image lab, Japan, Japan Industrial Publishing Co., Ltd., Dec. 10, 2013, vol. 24, No. 12, pp. 54-60 Cited in JPOA as the result of prior art search does not constitute the reasons for refusal.
Japanese Office Action for JP Application No. 2021-097037 dated Aug. 16, 2022 with English Translation.
Xiu Li et al., "Fast Accurate Fish Detection and Recognition of Underwater Images with Fast R-CNN", Oceans 2015—MTS/IEEE Washington, IEEE, Oct. 19, 2015, pp. 1-5.
Xiang Wang et al., "Salient object detection via fast R-CNN and low-level cues", 2016 IEEE International Conference on Image Processing (ICIP), IEEE, Sep. 25, 2016, pp. 1042-1046.
Peilei Dong et al., "Better Region Proposals for Pedestrian Detection with R-CNN", 2016 Visual Communications and Image Processing (VCIP), IEEE, Nov. 27, 2016, pp. 1-4.
Kaiming He et al., "Mask R-CNN", 2017 IEEE International Conference on Computer Vision (ICCV), IEEE, Oct. 22, 2017, pp. 2980-2988.
Ross Girshick, "Fast R-CNN", 2015 IEEE International Conference on Computer Vision (ICCV), IEEE, Dec. 7, 2015, pp. 1440-1448.
Feng Wang et al., "Coarse-to-fine human parsing with Fast R-CNN and over-segment retrieval", https://ieeexplore.ieee.org/document/7532696, IEEE, Aug. 19, 2016, p. 1.
U.S. Notice on Allowance for U.S. Appl. No. 16/770,359 dated Jul. 8, 2022.

* cited by examiner

PERSON VERIFICATION DEVICE AND METHOD AND NON-TRANSITORY COMPUTER READABLE MEDIA

CROSS-REFERENCE TO RELATED APPLICATIONS

The present application is a continuation application of U.S. patent application Ser. No. 16/770,359 filed on Jun. 5, 2020, which is a National Stage Entry of international application PCT/JP2018/038673, filed on Oct. 17, 2018, which claims the benefit of priority from Japanese Patent Application 2017-236304 filed on Dec. 8, 2017, the disclosures of all of which are incorporated in their entirety by reference herein.

TECHNICAL FIELD

The present disclosure relates to a person verification device and method and a non-transitory computer readable media. More specifically, the present disclosure relates to a person verification device and method and a non-transitory computer readable media for verifying whether or not a person included in an image is the same person as a registered person to check whether or not they are the same person.

BACKGROUND ART

In a system for determining whether or not the persons in different pictures (images) are the same, a technique has been known of verifying whether persons are the same using features of the persons such as color and texture. For example, Patent Literature 1 discloses a technique of verifying whether a person is the same as another person by cutting out a garment region of the person and using the texture features and the color features of the upper-body and the lower-body parts of the person. Further, Patent Literature 2 discloses a technique of verifying whether persons whose orientations differ from each other are the same by defining a weight of each region of each person in accordance with three patterns of the orientation of a front view, a side view, and a back view in advance with respect to the divided person regions each region, and weighting the features at the time of the above verification.

Further, Patent Literature 3 discloses a feature point extraction device that can be used to perform authentication of a person. In Patent Literature 3, for example, a shape model showing a statistical positional relationship among the feature points such as a face is used. The shape model is formed of an average position vector indicating an average position of the feature point and an eigen vector indicating a statistical variation in the feature point position. The feature point extraction device disclosed in Patent Literature 3 sets a weight on the feature point in accordance with an input image. The feature point extraction device sets a weight on the feature point belonging to a component which was not detected in the detection of the object to be small and sets a weight on the feature point belonging to a component which was detected in the detection of the object to be large. The feature point extraction device searches for a candidate position for the feature point of the input image and projects the candidate position for the feature point on a shape model in accordance with the weight of the feature point.

CITATION LIST

Patent Literature

Patent Literature 1: Japanese Unexamined Patent Application Publication No. 2013-186546
Patent Literature 2: Japanese Unexamined Patent Application Publication No. 2017-62633
Patent Literature 3: Japanese Unexamined Patent Application Publication No. 2011-232845

SUMMARY OF INVENTION

Technical Problem

In the verification technique disclosed in Patent Literature 1, when the orientations of persons differ, the features of the persons change accordingly, and thus there is a possibility that an erroneous verification result is output. On the other hand, in Patent Literature 2, it is possible to verify whether persons whose orientations differ from each other are the same as each other by defining a weight of each region in accordance with the orientations of the persons in advance and weighting the features at the time of verification. However, in Patent Literature 2, a weight of a region in each orientation must be defined in advance and thus it is not possible to deal with the orientation which has not been defined. When every orientation that can practically exist is defined in Patent Literature 2, there arises a problem that a large volume of defining work becomes necessary.

Further, Patent Literatures 1 and 2 give no consideration to the matter that a person is concealed. As regards this point, a weight on the feature point belonging to a component which was not detected in the detection of the object is set to be small whereas a weight on the feature point belonging to a component which was detected in the detection of the object is set large in Patent Literature 3. By this configuration, it is possible to perform authentication of a person using the feature points of the person which are not concealed. However, in Patent Literature 3, in order to extract the feature points from objects of various forms that differ in their orientations and postures, it is necessary to define a shape model corresponding to the various forms in advance. Therefore, even in Patent Literature 3, it is possible to deal with only the pre-defined orientation and the pre-defined posture of the object, while it is not possible to deal with other undefined forms.

In light of the aforementioned circumstances, one of the objects of the present disclosure is to provide a person verification device, a person verification method, and a non-transitory computer readable media that can verify whether or not persons who may take various forms in images are the same as each other without having to define the forms manually in advance.

Solution to Problem

In order to solve the aforementioned problem, the present disclosure provides a person verification device including:
weight estimation means for estimating, from a person's image in which a person is included, a weight of a human body part of the person in accordance with an existence probability of the human body part; feature creation means for creating a feature for verification based on the person's image and the estimated weight; and person verification means for comparing the created feature for verification and a verification feature stored in a verification feature storage means.

Further, the present disclosure provides a person verification method including:

estimating, from a person's image in which a person is included, a weight of a human body part of the person in accordance with an existence probability of the human body part;

creating a feature for verification based on the person's image and the estimated weight; comparing the created feature for verification and a verification feature stored in a verification feature storage means; and outputting a result of the comparison.

The present disclosure provides a non-transitory computer readable medium configured to store a program for causing a computer to perform processing of:

estimating, from a person's image in which a person is included, a weight of a human body part of the person in accordance with an existence probability of the human body;

creating a feature for verification based on the person's image and the estimated weight;

comparing the created feature for verification and a verification feature stored in a verification feature storage means; and outputting a result of the comparison.

Advantageous Effects of Invention

A person verification device and method and a non-transitory computer readable media according to the present disclosure can verify whether persons whose forms differ from each other are the same as each other without having to manually define the forms in advance.

DESCRIPTION OF EMBODIMENTS

Figure 1:
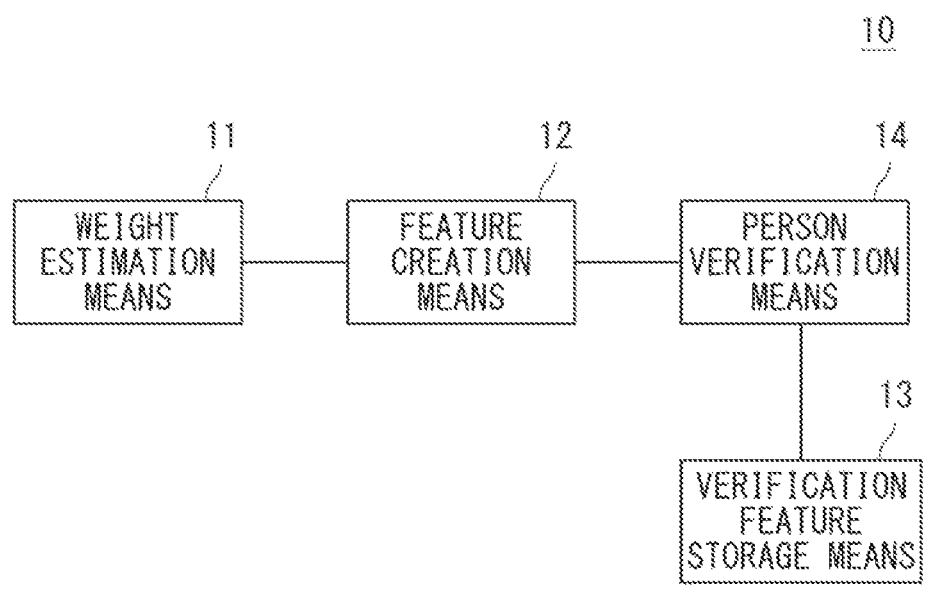
FIG. 1 is a block diagram schematically showing a person verification device according to the present disclosure.

An outline of the present disclosure is explained prior to the explanation of the example embodiments. FIG. 1 shows a schematic person verification device according to the present disclosure. A person verification device 10 includes a weight estimation means 11, a feature creation means 12, a verification feature storage means 13, and a person verification means 14.

The weight estimation means 11 estimates, from a person's image in which a person is included, a weight of a human body part of the person in accordance with an existence probability of the human body part. The feature creation means 12 creates a feature for verification based on the person's image and the weight estimated by the weight estimation means 11. The verification feature storage means 13 stores the feature of the person who is the object of verification as a verification feature. The person verification means 14 compares the feature for verification created by the feature creation means 12 and the verification feature stored in the verification feature storage means 13. Note that the verification feature storage means 13 may not necessarily be a part of the person verification device 10 as long as it can be referred to by the person verification means 14.

In the person verification device 10 according to this disclosure, the weight estimation means 11 estimates a weight of the human body part of the person in accordance with the existence probability of the human body part of the person. The feature creation means 12 extracts the feature for verification using the estimated weight. In the present disclosure, the feature is extracted using the weight according to the existence probability of the human body part, and the feature creation means 12 can create, for example, the feature based on the human body part of a high existence probability as the feature for verification. By performing verification using the feature created as described above, it is possible to verify whether or not the persons who may take various forms in images are the same as each other without having to manually define the features in advance.

Figure 2:
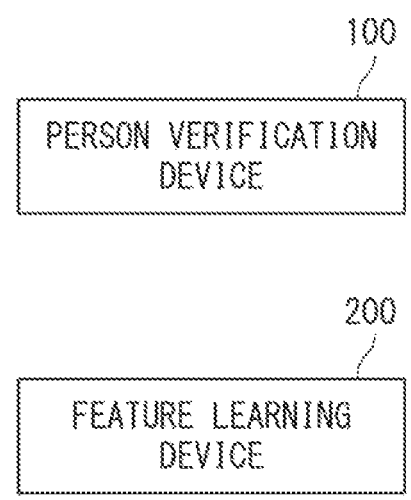
FIG. 2 is a block diagram showing a person verification device and a feature learning device according to a first example embodiment.

The example embodiments are explained with reference to the drawings. FIG. 2 shows a person verification device and a feature learning device according to a first example embodiment. The person verification device 100 verifies whether or not a person included in a picture (an image) taken using a camera or the like is the same person as a person who has been registered in advance using a feature extracted from the image. The person verification device 100 corresponds to the image verification device 10 in FIG. 1. The feature learning device 200 learns the model used for the feature extraction in verifying the person by the person verifying device 100. The feature learning device 200 learns, for example, a convolutional neural network used for the feature extraction.

The person verification device 100 and the feature learning device 200 include, for example, a computer device that includes a processor and a memory and that operates in accordance with a program readout from the memory by the processor. Note that the person verification device 100 and the feature learning device 200 need not necessarily be physically separate devices. For example, the same computer device may be used for the person verification device 100 and the feature learning device 200.

Figure 3:
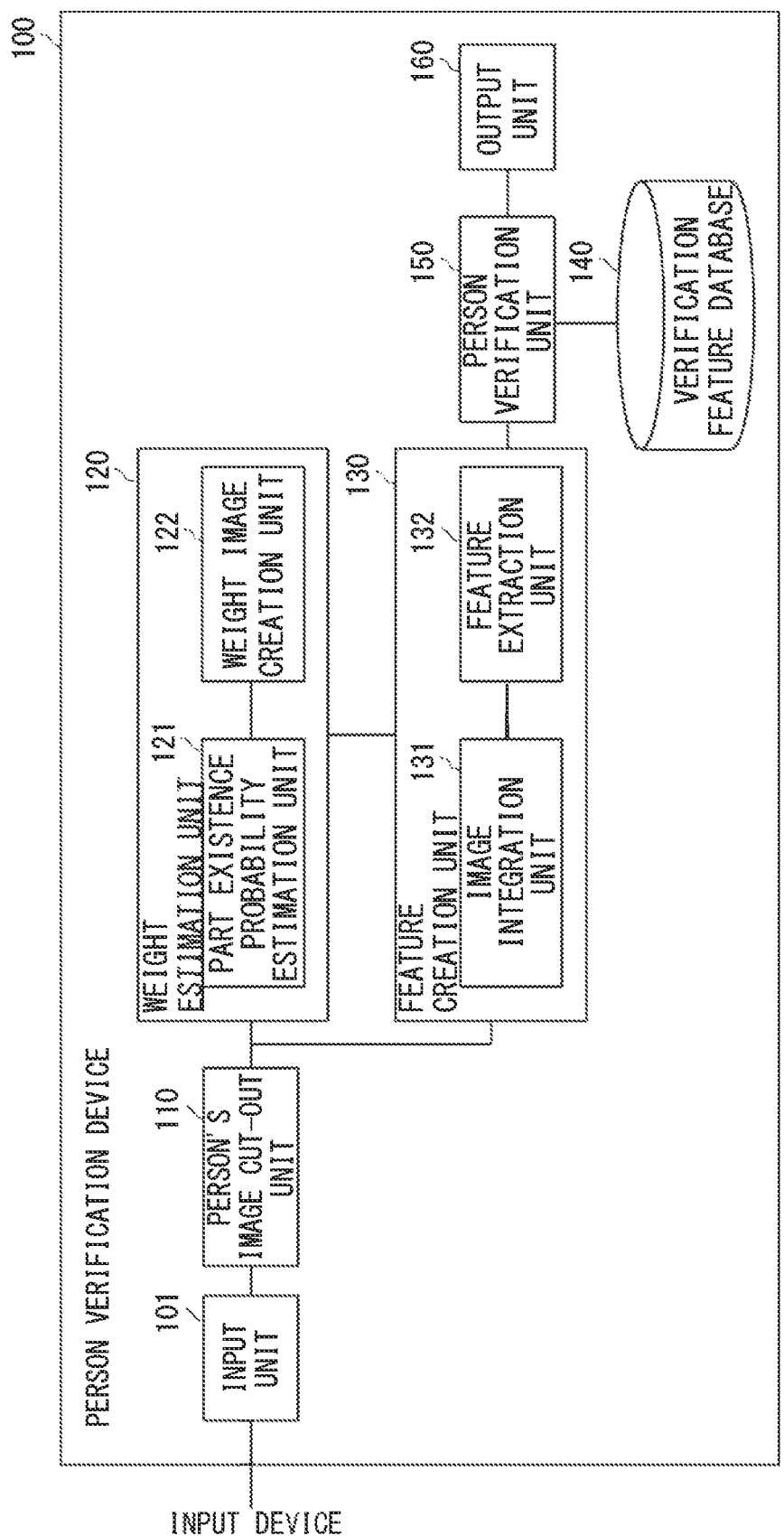
FIG. 3 is a block diagram showing a structural example of the person verification device.

FIG. 3 shows the person verification device 100. The person verification device 100 includes an input unit 101, a person's image cut-out unit 110, a weight estimation unit 120, a feature creation unit 130, a verification feature database 140, a person verification unit 150, and an output unit 160. In the person verification device 100, at least a part of the functions of the person's image cut-out unit 110, the weight estimation unit 120, the feature creation unit 130, and the person verification unit 150 may be realized by having the processor operate according to the program. The verification feature database 140 is configured using, for example, an auxiliary storage device such as a hard disk device.

The input unit 101 receives an image, in which a person who is the object of verification is included, from an external input device such as a camera. The person's image cut-out unit 110 cuts out a person region where the person exists from the input image. The person's image cut-out unit 110 performs, for example, a scaling or zero padding processing to the cut-out image of the person region and converts the image of the person region to an image of a predetermined size with the aspect ratio thereof being maintained. The person's image cut-out unit 110 cuts out the person region using, for example, a known method. The person's image cut-out unit 110 cuts out the person region using, for example, a method using the HOG (Histogram of Oriented Gradients) or a method using the background subtraction.

The weight estimation unit 120 creates a weight image from a person region image (person's image) cut out by the person's image cut-out unit 110. The weight estimation unit 120 corresponds to the weight estimation means 11 in FIG. 1.

The weight estimation unit 120 includes a part existence probability estimation unit 121 and a weight image creation unit 122. The part existence probability estimation unit 121 estimates the probability of existence of the specific human body part in each pixel of the input person region image. Here, the "specific human body part" refers to a part of a human body whose position can be estimated from the image. The specific human body part includes parts that can be represented by a dot such as a wrist or a nose. Further, the specific human body part includes parts that can be represented by a plane such as an arm, or a chest.

The part existence probability estimation unit 121 estimates the probability of existence of the specific human body part using, for example, a known method. In estimating the existence probability of the human body part, it is possible to use, for example, a method based on the convolutional neural network or the method using the HOG. The method based on the convolutional neural network is described in, for example, "Realtime Multi-Person 2D Pose Estimation using Part Affinity Fields" (Zhe Cao et al., CVPR2017). For example, the part existence probability estimation unit 121 estimates the probability of existence of the human body part in each pixel for J number of the human body parts, J being a predetermined positive integer.

The weight image creation unit 122 creates a weight image using the existence probability estimated by the part existence probability estimation unit 121. A pixel value (weight) of each pixel of the weight image indicates the significance of each pixel. The weight image creation unit 122 creates a weight image of, for example, each human body part for which the existence probability has been estimated. The weight image creation unit 122 creates J number of weight images when, for example, the existence probability of J number of human body parts has been estimated. The weight image creation unit 122, for example, performs normalization processing on the existence probability estimated for each human body part based on the existence probability of the whole human body part and calculates a weight of each pixel. By performing the normalization processing, it is possible to suppress an effect of an error in the estimation of the existence probability caused by a difference in the camera used in acquiring an image and a difference in the surrounding environment. The weight image creation unit 122 may perform thresholding to the existence probability (weight) of the human body part and bring the weight to 0 when the existence probability is equal to or lower than the predetermined threshold value.

The feature creation unit 130 creates a feature used for the verification based on the person region image cut out by the person's image cut-out unit 110 and the weight image created by the weight image creation unit 122. The feature creation unit 130 corresponds to the feature creation means 12 in FIG. 1.

The feature creation unit 130 includes an image integration unit 131 and a feature extraction unit 132. The image integration unit 131 couples (integrates) the person region image and the weight image of each human body part in a channel direction. The feature extraction unit 132 creates a feature used in verifying the person, using the image integrated by the image integration unit 131 as an input, by using the convolutional neural network that has been learnt using the feature learning device 200 (see FIG. 2).

The verification feature database 140 stores the feature (the verification feature) of the person who is the object of verification. The verification feature is created by, for example, applying the person image prepared in advance and the weight image created based on the person image to the convolutional neural network that has been learned using the feature learning device 200. The verification feature database 140 corresponds to the verification feature storage means 13 in FIG. 1.

The person verification unit 150 compares the feature created by the feature creation unit 130 and the verification feature stored in the verification feature database 140. The output unit 160 outputs the result of comparison by the person verification unit 150. The output unit 160 outputs the result of comparison indicating whether or not the person included in the person region image that has been cut out by the person's image cut-out unit 110 is the same as the person who is the object of verification using a display device or an acoustic device, or a lamp. The person verification unit 150 corresponds to the person verification means 14 in FIG. 1.

Figure 4:
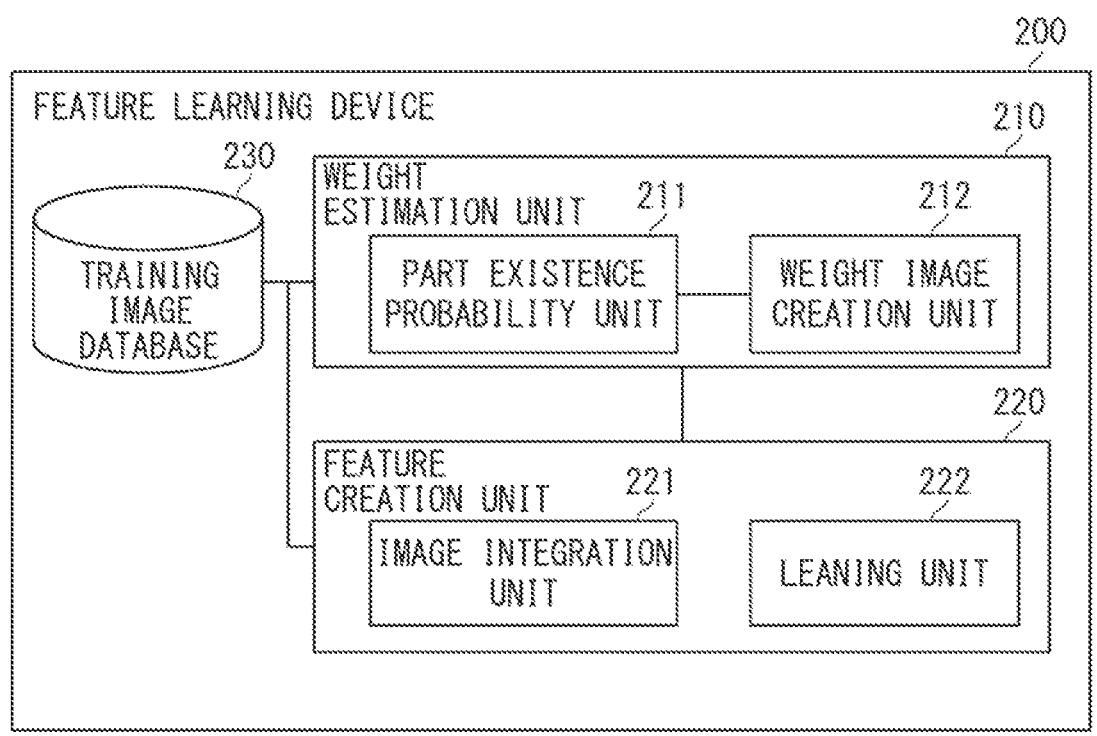
FIG. 4 is a block diagram showing a structural example of the feature learning device.

FIG. 4 shows the feature learning device 200. The feature learning device 200 includes a weight estimation unit 210, a feature learning unit 220, and a training image database 230. In the feature learning unit 200, at least a part of the functions of the weight estimation unit 210 and the feature learning device 200 may be realized by having the processor operate according to the program. The training image database 230 is configured using, for example, an auxiliary storage device such as a hard disk device.

The training image database 230 stores a plurality of training images (teacher data) used for learning the convolutional neural network. The training image database 230 stores, for example, a training image that includes a person in association with a label that specifies the person included in the training image. An ID (Identifier) and a name, for instance, are used for the label. The size of the training images is unified by, for example, performing an appropriate scaling or the zero padding processing to the person's image in advance. The size of the training image is, for example, the same as that of the person region image created by the person's image cut-out unit 110 of the person verification device 100.

The weight estimation unit 210 creates a weight image for each of the plurality of training images stored in the training image database 230. The weight estimation unit 210 includes a part existence probability estimation unit 211 and a weight image creation unit 212. The part existence probability estimation unit 211 estimates the probability of existence of the specific human body part in each pixel of the training image. The estimation of the existence probability of the human body part performed by the part existence probability estimation unit 211 may be the same as the estimation of the existence probability of the human body part performed by the part existence probability estimation part 121 of the person verification device 100 shown in FIG. 3.

The weight image creation unit 212 creates the weight image using the existence probability estimated by the part existence probability estimation unit 211. The weight image creation unit 212 creates the weight image, for example, for each human body part for which the existence probability is estimated. Creation of the weight image performed by the weight image creation unit 212 may be the same as the creation of the weight image performed by the weight image creation unit 122 of the person verification device 100.

The feature learning unit 220 learns the convolutional neural network using the plurality of training images and their labels and the weight image created from each training image. The feature learning unit 220 includes an image integration unit 221 and a learning unit 222. The image integration unit 221 integrates the training image and the weight image in a channel direction. The learning unit 222 learns the convolutional neural network using the image integrated by the image integration unit 221. To be more specific, the learning unit 222 learns the convolutional neural network using the image received from the image integration unit 221 so as to have the output thereof approach the label assigned to the input image (training image).

Figure 5:
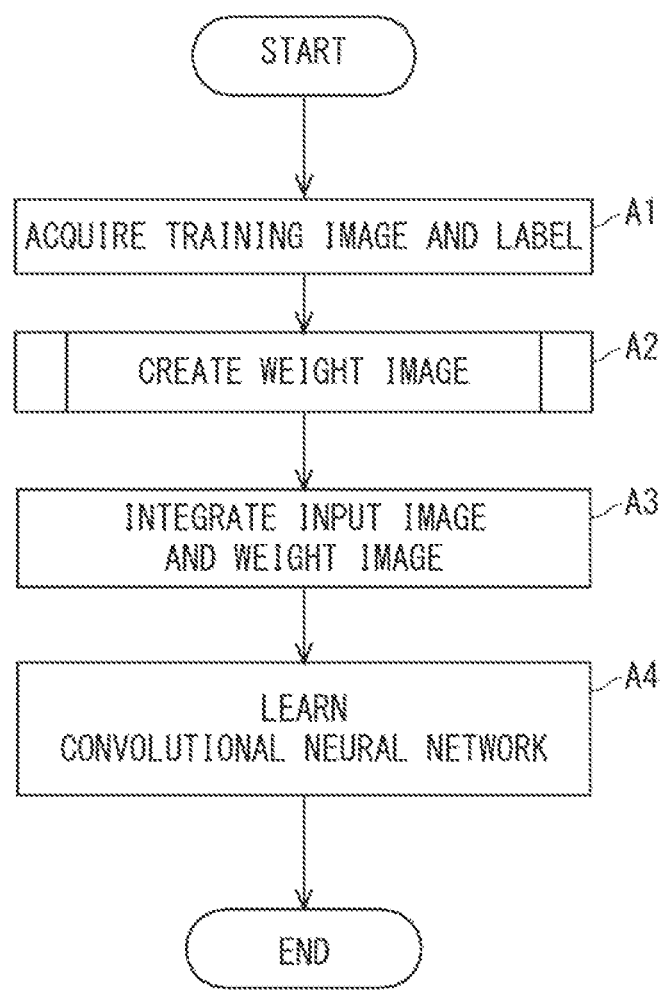
FIG. 5 is a flowchart showing steps of processing performed in the feature learning device.

FIG. 5 shows steps of processing performed in the feature learning device 200. The weight estimation unit 210 and feature learning unit 220 acquire the training image from the training image database 230 (Step A1). The feature learning unit 220 also acquires the label corresponding to the training image in Step A1. The weight estimation unit 210 creates, from the image acquired from the training image database 230, a weight image of each body part of the person included in the image (Step A2). The weight estimation unit 210 outputs the created weight image to the feature creation unit 220.

Figure 6:
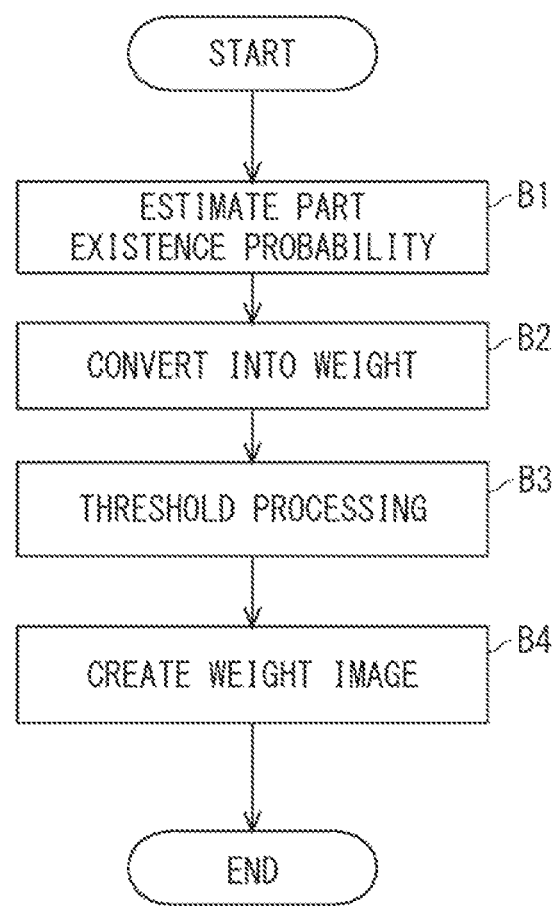
FIG. 6 is a flowchart showing steps of creating a weight image.

FIG. 6 is a flowchart showing steps of creating the weight image. In the weight estimation unit 210, the part existence probability estimation unit 211 calculates the existence probability of a human body part in each pixel of the input image using a known body part estimation technique (Step B1). In Step B1, the part existence probability estimation unit 211 calculates the existence probability of the human body part in each pixel for respective human body parts using, for example, the method using the convolutional neural network or the method using the HOG. The part existence probability estimation unit 211 outputs the calculated existence probability to the weight image creation unit 212.

The weight image creation unit 212 converts the existence probability of each human body part acquired from the part existence probability estimation unit 211 into weight (Step B2). In Step B2, the weight image creation unit 212 converts the existence probability of the human body part into weight using, for example, the following expression.

[Expression 1]

$$w_{jxy} = \frac{p_{jxy} - \min(P)}{\max(P) - \min(P)} \quad (1)$$

In the aforementioned Expression 1, $p_{jxy}$ denotes the existence probability of a human body part j in a pixel (x, y) of an input image (a training image) where j is an integer of 1 to J, and $w_{jxy}$ denotes a weight of the human body part j at a position (x, y). Further, max(P) denotes the maximum value of the existence probability of all human body parts and min(P) denotes the minimum value of the existence probability of all human body parts.

The weight image creation unit 212 applies the threshold processing to the weight converted in Step B2 (Step B3). In Step B3, the weight image creation unit 212 compares, for example, the weight $w_{jxy}$ and the predetermined threshold value and sets the value of $w_{jxy}$ to be 0 when the weight $w_{jxy}$ is equal to or smaller than the threshold value. Then, the weight image creation unit 212 creates a weight image by quantizing the weight $w_{jxy}$ to be of a predetermined bit number (Step B4). In Step B4, the weight image creation unit 212 converts the weight $w_{jxy}$ into the pixel value of the position (x, y) of the weight image by, for example, quantizing the weight $w_{jxy}$ to be of the same bit number as the pixel value of the training image.

Turning back to FIG. 5, the image integration unit 221 of the feature leaning unit 220 integrates the training image acquired in Step A1 and the weight image created in Step A2 in the channel direction (Step A3). The learning unit 222 applies the training image and the weight image integrated in Step A3 to the convolutional neural network. The learning unit 222 learns the convolutional neural network by updating the parameters of the convolutional neural network using the label of the training image (Step A4). The feature learning unit 220 repeatedly perform Steps A1 to A4 on plurality of training images and learns the convolutional neural network capable of identifying a person.

Figure 7:
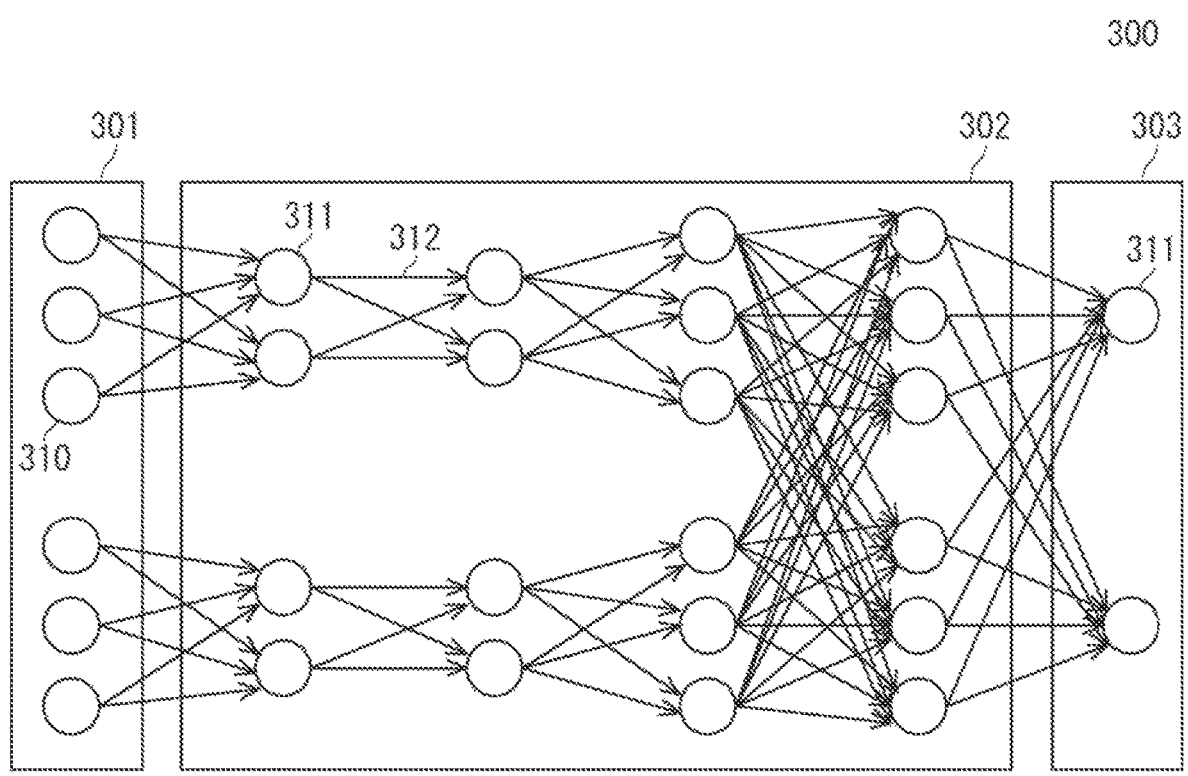
FIG. 7 is a block diagram showing an example of a convolutional neural network.

FIG. 7 shows an example of the convolutional neural network. A convolutional neural network 300 includes an input layer 301, an intermediate layer 302, and an output layer 303. The input layer 301 includes a plurality of nodes 310, and each of the intermediate layer 302 and the output layer 303 includes a plurality of nodes 311. Further, the intermediate layer 302 includes a plurality of layers each formed of the plurality of nodes 311.

The nodes 310 and 311 denote the processing performed in the convolutional neural network. For example, the nodes 310 included in the input layer 301 denote the processing of inputting the training image and the weight image that have been integrated in the channel direction. The nodes 311 included in the intermediate layer 302 and the output layer 303 denote the processing of performing an operation on the input value. An edge 312 that connects the nodes denotes the processing of multiplying the weight on the output value of the node.

Note that the convolutional neural network 300 shown in FIG. 7 is merely a schematic example, and the convolutional neural network learned by the learning unit 222 is not to be limited to the one shown in FIG. 7. For example, the intermediate layer 302 of the convolutional neural network to be learned may include more nodes and layers than the intermediate layer 302 of the convolutional neural network 300 shown in FIG. 7.

In Step A4, the learning unit 222 learns the weight of the edge 312, for example, by using a difference between the output value of the output layer 303 when the training image and the weight image integrated in the channel direction are input in the input layer 301 and the label of the training image, and the error propagation method or the like. For example, by using images of persons in various postures as the training images, it is possible to learn the convolutional neural network for identifying persons in various postures.

Figure 8:
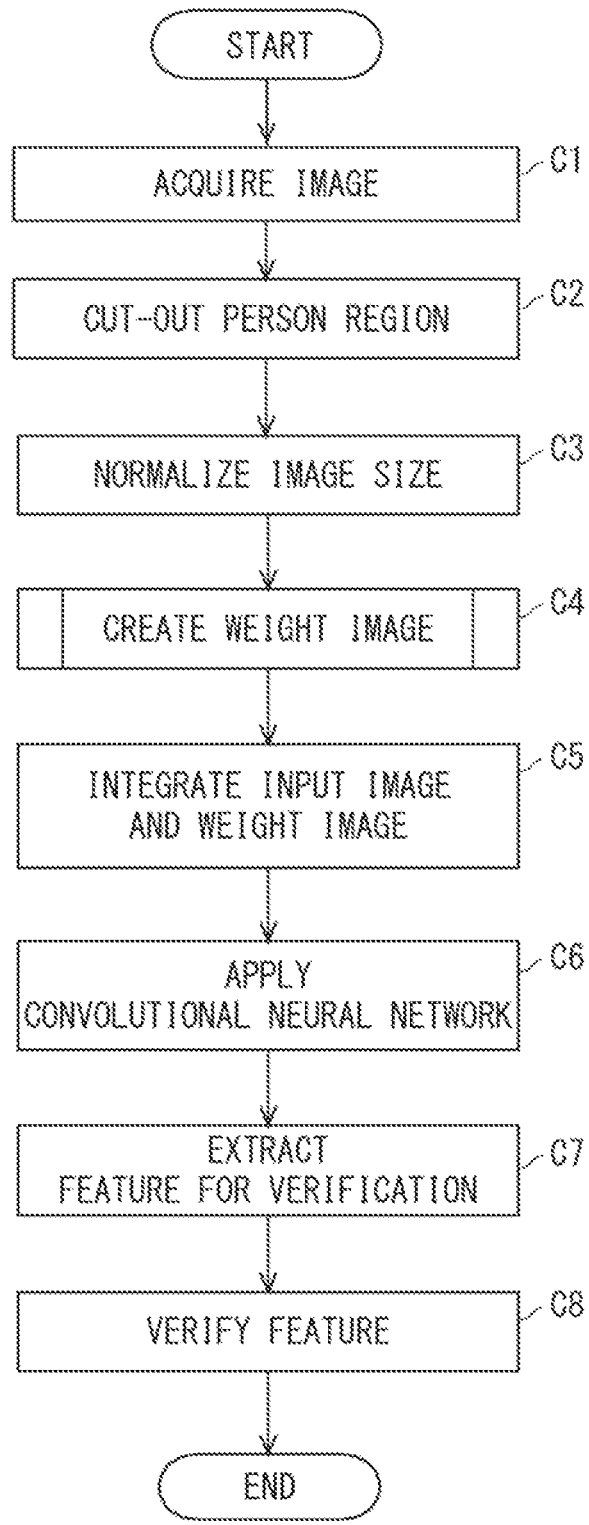
FIG. 8 is a flowchart showing steps of processing performed in the person verification device.

Next, the steps of processing performed by the person verification device 100 are explained. FIG. 8 shows steps of processing performed in the person verification device 100. The input unit 101 acquires an image that includes the target person from the input device such as a camera (Step C1). The person's image cut-out unit 110 cuts out the person region from the image acquired in Step C1 (Step C2). In Step C2, the person's image cut-out unit 110 detects, for example, a rectangular area where a person exists using a known technique of detecting a person's position and cuts out an image within the rectangular region.

The person's image cut-out unit 110 performs image size normalization processing on the image cut out in Step C2 in order to bring the size and the shape of the image to be of a predetermined size and shape and creates the person region image (Step C3). In Step C3, the person's image cut-out unit 110 converts, for example, the cut-out image into a square image whose length is the same as its width. For example, the person's image cut-out unit 110 magnifies or scales down the cut-out image so that the length of the long side thereof becomes a fixed length such as 256. The person's image cut-out unit 110 then embeds the pixel value with 0 so that the length of the short side of the cut-out image becomes a fixed length and creates the person region image of a square shape.

The weight estimation unit 120 acquires the person region image created in Step C3 from the person's image cut-out unit 110. The weight estimation unit 120 creates the weight image from the acquired person region image (Step C4). The creation of the weight image performed by the weight estimation unit 120 may be the same as the creation of the weight image in the weight estimation unit 210 of the feature learning device 200 explained using FIG. 6 except that the image from which the weight image is created is changed from the training image to the person region image. In Step C4, the weight estimation unit 120 creates the weight image based on the existence probability of the human body part in the person region image for, for example, a plurality of human body parts.

The feature creation unit 130 acquires the person region image created in Step C3 from the person's image cut-out unit 110 and acquires the weight image created in Step C4 from the weight estimation unit 120. The image integration unit 131 of the feature creation unit 130 integrates the acquired person region image and the weight image in the channel direction (Step C5). The number of channels of the integrated image is 3+J when, for example, the person region image is a color image and the weight estimation unit 120 creates J number of weight images.

The feature extraction unit 132 applies the person region image and the weight image integrated in the channel direction in Step C5 that are input from the image integration unit 131 to the convolutional neural network that has been learned (Step C6). In Step C6, the feature extraction unit 132 inputs the person region image and the weight image into the convolutional neural network learned through the steps shown in FIG. 5 using the feature learning device 200.

The feature extraction unit 132 extracts an intermediate feature of the convolutional neural network as the feature for verification (Step C7). In Step C7, the feature extraction unit 132 extracts the output value of each node in a certain layer included in the intermediate layer 302 (see, FIG. 7) of the convolutional neural network as the feature for verification. The feature extraction unit 132 extracts, for example, the output value of the last tier of the intermediate layer 302, namely, the output value of each node in the layer which is one layer before the output layer 303, as the feature for verification.

The person verification unit 150 compares the feature extracted in Step C7 with the verification feature stored in the verification feature database 140 (Step C8). In Step C8, the person verification unit 150 sequentially selects, for example, each verification feature stored in the verification feature database 140 and compares the selected verification feature with the feature for verification extracted in Step C7.

The person verification unit 150 calculates, for example, at least one of a distance such as a Euclidean distance and a similarity (angle) such as a cosine similarity for the two features to be compared. The person verification unit 150 determines that the features match each other when, for example, the Euclidean distance between the feature for verification extracted in Step C7 and the verification feature is equal to or smaller than the predetermined threshold value. Further, the person verification unit 150 determines that the features match each other when the cosine similarity between the feature for verification extracted in Step C7 and the verification feature is equal to or larger than the predetermined similarity.

When the person verification unit 150 determines that the feature for verification extracted in Step C7 matches any one of the verification features, the person verification unit 150 notifies the output unit 160 of the information for identifying a person whose verification features matches with the feature for verification as a comparison result. When the person verification unit 150 determines that the features for verification extracted in Step C7 match none of the verification features, the person verification unit 150 notifies the output unit 160 of the determination. The output unit 160 outputs the result of comparison (the verification result) performed by the person verification unit 150 to an external device. The output unit 160 displays the image of the person region cut out in Step C2 and information for identifying the person on, for example, a display device.

In the present example embodiment, the weight estimation unit 120 creates the weight image based on the existence probability of the human body part. In the person image region, the part where the specific human body part exists is an essential part in extracting the feature in the person verification, and the weight image created by the weight estimation unit 120 indicates the position on the image to which attention should be paid and its importance in verification processing. The feature creation unit 130 integrates the person region image and the weight image in the channel direction and applies the integrated image to the convolutional neural network and extracts the intermediate feature of the convolutional neural network as the feature for verification.

In the convolutional processing of the convolutional neural network, since the result of convolution in each channel is added up and output to the next layer, the pixel value of the person region image at a pixel where the pixel value (weight) of the weight image (weight) is large has a large influence in the subsequent layers. In the present example embodiment, it is possible to extract a feature that is effective when performing verification that focuses on the human body part by extracting the feature from the person region image using the weight image created from the existence probability of the human body part as a clue. Since the above feature is used in the verification, the person verification device 100 can perform accurate verification without having to depend on the depression angle at the time of image pick-up and the orientation, the posture, and concealed state of the person.

Here, in Patent Literature 2, in order to verify a person whose orientation is changed time to time, it was necessary to define the weight of each region in accordance with the orientation of the person in advance. Further, in Patent Literature 3, in order to extract the feature point from the object of various forms that differ in the orientation and the posture, it was necessary to define the shape model adaptable to various forms in advance. In contrast, in the present disclosure, the convolutional neural network is learned using the training image and the weight image and the feature is extracted by applying the person region image and the weight image to the learned convolutional neural network. Therefore, the person verification device 10 can verify a person without having to manually define the persons in various forms in images in advance.

Further, in Patent Literatures 1 and 2, no consideration is given to the situation where the person is concealed or the person takes a posture other than standing, and thus accurate verification may not be performed under the actual circumstances. For example, in verifying a person in these Patent Literatures, when another person is in front of the person to be verified, another person may conceal the person to be verified. In this case, when an image of the person who is concealing the person to be verified is divided as a part of the person to be verified, an erroneous verification result may be obtained as a consequence thereof. However, in the present example embodiment, the person verification is performed based on the feature according to the existence probability of a human body part, and thus it is possible to obtain a correct verification result even under the actual circumstances.

Figure 9:
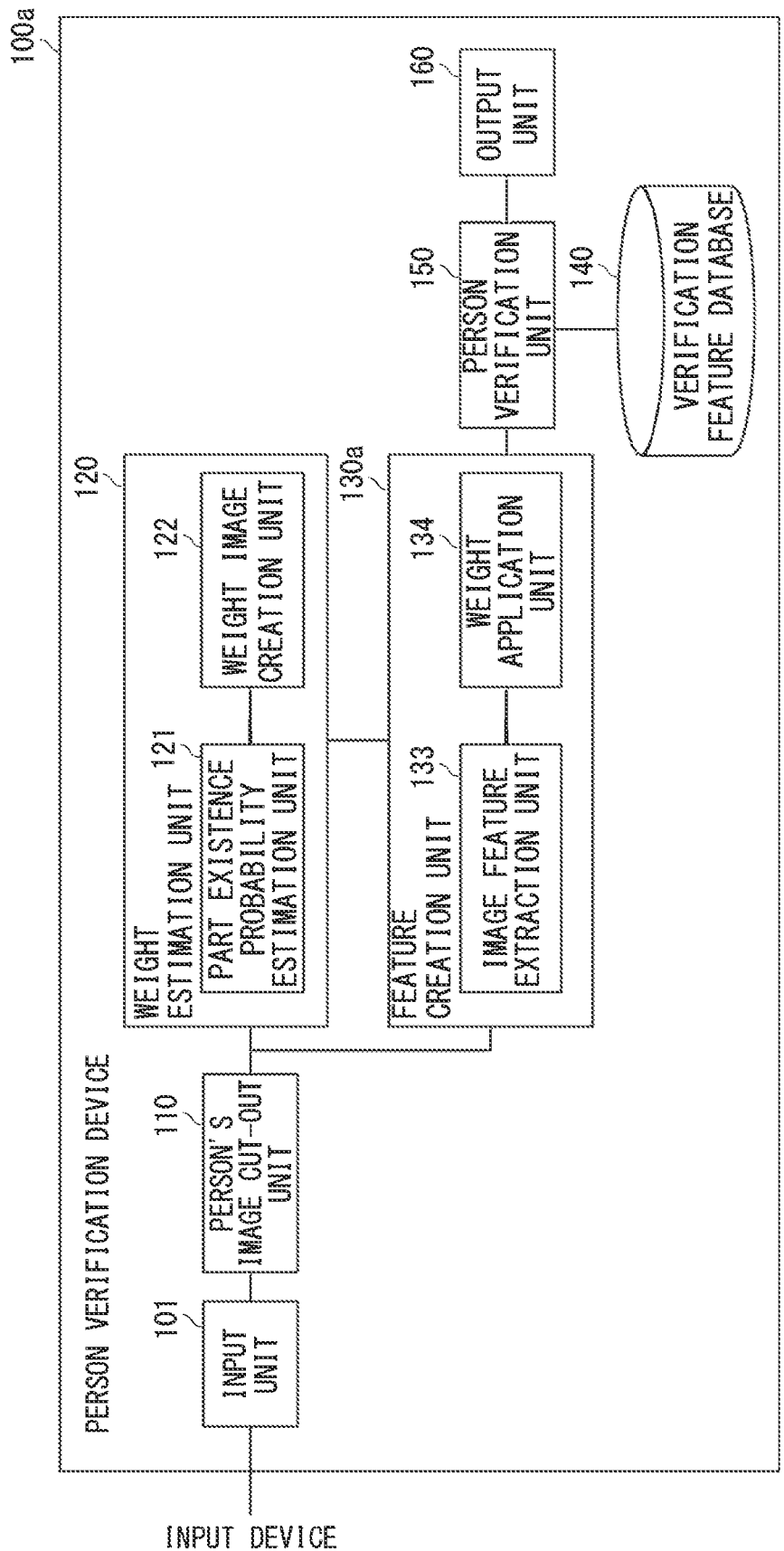
FIG. 9 is a block diagram showing a person verification device according to a second example embodiment.

Next, a second example embodiment is explained. FIG. 9 shows a person verification device according to the second example embodiment. A person verification device 100a according to the present example embodiment differs from the person verification device 100 according to the first example embodiment shown in FIG. 3 in a configuration of a feature creation unit 130a. In the present example embodiment, the feature creation unit 130a includes an image feature extraction unit 133 and a weight application unit 134. In the present example embodiment, the feature creation unit 130a applies information on the weight image as a mask for the extracted feature for verification. Other points may be the same those in the first example embodiment.

The image feature extraction unit 133 calculates the predetermined image feature from person region image. The image feature extraction unit 133 calculates, for example, the feature expressing features in the image by frequency, as the predetermined image feature, such as a color histogram feature, a gradient histogram feature, or a combination thereof. For example, the image feature extraction unit 133 calculates the image feature that each pixel of the person region image is classified in N number of sections (bins) according to the color or the gradient, where N being an integer equal or larger than 2.

The weight application unit 134 calculates the feature which is weighted based on the weight image of each human body part with respect to the frequency of appearance of the image feature calculated by the image feature extraction unit 133. The weight application unit 134 calculates, for example, the value $b_{jn}$ of the n-th bin of the feature which has been weighted using the weight image of the human body part j using the following expression in which n is an integer from 1 to N.

[Expression 2]

$$b_{jn} = \sum_x \sum_y w_{jxy} \varepsilon_{nxy} \qquad (2)$$

In the aforementioned Expression, $w_{jxy}$ denotes the weight of the human body part j in the pixel (x, y). $\varepsilon_{nxy}$ expresses whether or not the pixel (x, y) of the person region image is voted for the n-th bin. The value of $\varepsilon_{nxy}$ is 1 when the pixel is voted for the n-th bin and is 0 when the pixel is voted for other bins.

The weight application unit 134 creates the feature for verification based on the feature which has been weighted based on the weight image of each human body part. The weight application unit 134 creates the feature for verification by, for example, joining the features which have been weighted based on the weight images of respective human body parts. When doing so, the weight application unit 134 may create the feature for verification by multiplying the coefficient that is defined for each human body part on the features which have been weighted based on the weight images of respective human body parts and joining the features. Alternatively, the weight application unit 134 may create the feature for verification by taking the maximum value or calculating the average value of the feature which has been weighted based on the weight image of each human body part.

Figure 10:
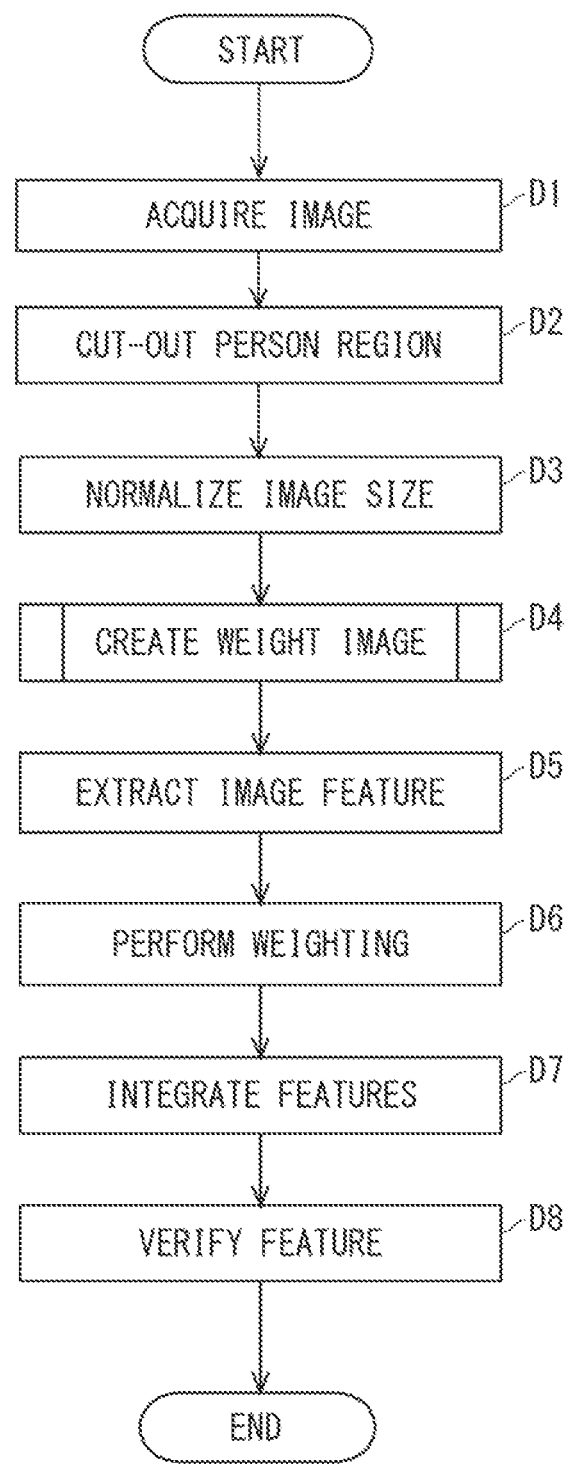
FIG. 10 is a flowchart showing steps of processing performed in the person verification device according to the second example embodiment.

FIG. 10 shows steps of processing performed in the person verification device 100a according to the present example embodiment. The input unit 101 acquires an image that includes the target person from the input device such as a camera (Step D1). The person's image cut-out unit 110 cuts out the person region from the image acquired in Step D1 (Step D2). The person's image cut-out unit 110 performs normalization processing on the image size of the image cut out in Step D2 in order to bring the size and the shape of the image to a predetermined size and shape and creates the person region image (Step D3). The weight estimation unit 120 creates the weight image from the person region image created by the image cut-out unit 110 in Step D3 (Step D4). Steps D1 to D4 may be the same as the Steps C1 to C4 in FIG. 8.

The image feature extraction unit 133 of the feature creation unit 130 extracts the image feature for verification from the person region image created in Step D3 (Step D5). The image feature extraction unit 133 extracts the feature expressed by its frequency of appearance in an image such as the color histogram or the gradient histogram as the image feature in Step D4. The weight application unit 134 performs weighting of the image feature extracted in Step D5 using the weight image created in Step D4 (Step D6). The weight application unit 134 calculates the value $b_{jn}$ of the n-th bin of the feature which is weighted using the weight image of each human body part of 1 to J using the aforementioned Expression 2.

The weight application unit 134 creates the feature for verification by integrating the weighted image features for each human body part (Step D7). The weight application unit 134 creates, for example, the feature obtained by joining the values $b_{1n}$ to $b_{Jn}$ of the n-th bin that is weighted using the weight image of the human body parts 1 to J calculated in Step D6 in a one-dimensional vector as the feature for verification. In this case, the number of dimensions of the feature for verification may be J times the number of dimensions of the image feature extracted by the image feature extraction unit 133.

In the present example embodiment, the verification feature database 140 stores the feature created by the same steps as those of creating the feature for verification by the feature creation unit 130a as the feature for verification. The person verification unit 150 compares the feature extracted in Step D7 with the verification feature stored in the verification feature database 140 (Step D8). The person verification unit 150 determines that the features match each other when, for example, the Euclidean distance between the feature for verification extracted in Step D7 and the verification feature is equal to or smaller that the predetermined value. Further, the person verification unit 150 determines that the features match each other when the cosine similarity between the feature for verification extracted in Step D7 and the verification feature is equal to or larger than the predetermined similarity. The output unit 160 outputs the result of comparison (the verification result) performed by the person verification unit 150 to an external device. Step D8 may be the same as Step C8 in FIG. 8 except that the feature to be verified is the image feature obtained by weighting using the weight image.

In the present example embodiment, the feature creation unit 130a weights the image feature expressing features in the image by frequency using the weight image created based on the existence probability of the human body part. In the present example embodiment, the image feature which includes many components derived from human body parts can be created by weighting the image feature extracted from the person region image using the weight image created from the existence probability of the human body part as a clue. By performing verification of the person using the image feature described above, the person verification device 100a can perform accurate verification without having to depend on the depression angle and the orientation, the posture, and the concealed state of the person at the time of image pick-up in the similar manner as that in the first example embodiment. Other effects are the same as that of the first example embodiment.

Note that in the first example embodiment, an example in which the verification feature stored in the verification feature database 140 is created based on the person's image prepared in advance is explained. However, the present disclosure is not to be limited thereto. For example, when an operator etc. of the person verification device 100 gives an instruction, at a certain time, to register the person in the person region image created by the person's image cut-out unit 110 as a verification target for later time, the verification feature of that person may be registered in the verification feature database 140. Specifically, the feature creation unit 130 may register the person region image of that person and the feature for verification created based on the weight image created from the person region image in the verification feature database 140 and the registered verification feature may be used in verification performed thereafter. Similarly, in the second example embodiment, the feature for verification created by the feature creation unit 130a may be registered in the verification feature database 140.

Further, in the first example embodiment, an example in which the feature creation unit 130 extracts the feature for verification from the convolutional neural network learned using the feature learning device 200 (see, FIG. 4) is explained. However, the present disclosure is not to be limited thereto. For example, in the feature learning device 200, another model which is different from the convolutional neural network which can identify a person may be learned, and the feature creation unit 130 may create a feature for verification using the model.

In the aforementioned example embodiment, the program for causing a computer to operate as the person verification device 100 and/or the feature learning device 200 can be stored and provided to a computer using any type of non-transitory computer readable media. Non-transitory computer readable media include any type of tangible storage media. Examples of non-transitory computer readable media include magnetic storage media (such as floppy disks, magnetic tapes, or hard disk drives), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), or flash ROM, RAM (random access memory)). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

As described above, the present disclosure has been described with reference to the example embodiments, however it is not to be limited thereto. The configuration and the details of the present disclosure can be modified in any way that can be understood by one skilled in the art within the scope of the disclosure.

For example, the whole or part of the example embodiments disclosed above can be described as, but not limited to, the following supplementary notes.

(Supplementary Note 1)

A person verification device comprising:

weight estimation means for estimating, from a person's image in which a person is included, a weight of a human body part of the person in accordance with an existence probability of the human body part;

feature creation means for creating a feature for verification based on the person's image and the estimated weight; and person verification means for comparing the created feature for verification and a verification feature stored in a verification feature storage means.

(Supplementary Note 2)

The person verification device described in Supplementary note 1, wherein the weight estimation means comprises:

part existence probability estimation means for estimating an existence probability of the human body part for each pixel of the person's image; and weight image creation means for creating a weight image expressing the weight based on the estimated existence probability.

(Supplementary Note 3)

The person verification device described in Supplementary note 2, wherein the part existence probability estimation means estimates the existence probability of the human body part for each of a plurality of human body parts and the weight image creation means creates the weight image for each of the plurality of human body parts.

(Supplementary Note 4)

The person verification device described in Supplementary note 3, wherein the weight image creation means normalizes the existence probability estimated for each human body part using the maximum and the minimum values of the existence probability of the plurality of human body parts and creates the weight image based on the normalized existence probability.

(Supplementary Note 5)

The person verification device described in Supplementary note 3 or 4, wherein the weight image creation means calculates the weight $w_{jxy}$ for a j-th body part at a position (x, y) in an image using the following expression:

$$w_{jxy} = \frac{p_{jxy} - \min(P)}{\max(P) - \min(P)} \quad \text{[Expression 3]}$$

where J is a number of the human body parts for which the existence probability is estimated, j is an integer of from 1 to J, max(P) is the maximum value of the existence probability of the plurality of human body parts, and min(P) is the minimum value of the existence probability of the plurality of human body parts.

(Supplementary Note 6)

The person verification device described in any one of Supplementary notes 2 to 5, wherein the feature creation means creates the feature for verification by applying the person's image and the weight image to the convolutional neural network.

(Supplementary Note 7)

The person verification device described in Supplementary note 6, wherein the feature creation means extracts an intermediate feature of the convolutional neural network as the feature for verification.

(Supplementary Note 8)

The person verification device described in Supplementary note 6 or 7, wherein:

the convolutional neural network comprises an input layer, an intermediate layer, and an output layer each including a plurality of nodes; and the feature creation means extracts an output value of each node in a layer which is the one before the output layer as the feature for verification.

(Supplementary Note 9)

The person verification device described in any one of Supplementary notes 6 to 8, wherein the convolutional neural network is learned by a learning device.

(Supplementary Note 10)

The person verification device described in Supplementary note 9, wherein the learning device learns the convolutional neural network by applying a training image to which a label indicating a person included in the image is assigned and the weight image created from the training image to the convolutional neural network so that an output of the convolutional neural network becomes the label.

(Supplementary Note 11)

The person verification device according to Supplementary notes 2 to 5, wherein the feature creation means extracts a feature obtained by weighting an image feature extracted from the person's image using the weight image as the feature for verification.

(Supplementary Note 12)

The person verification device described in Supplementary note 11, wherein the feature creation means comprises:

an image feature extraction means for extracting the image feature from the person's image; and a weight application means for creating the feature for verification by applying a weight of the weight image to the image feature extracted by the image feature extraction means.

(Supplementary Note 13)

The person verification device described in Supplementary note 12, wherein the image feature extraction means extracts a feature obtained by expressing a value calculated from each pixel of the person's image by frequency of appearance as the image feature.

(Supplementary Note 14)

The person verification device described in Supplementary note 13, wherein the image feature extraction means extracts at least one of features among a color histogram feature, a gradient histogram feature, and a combination of the color histogram feature and the gradient histogram feature as the image feature.

(Supplementary Note 15)

The person verification device described in Supplementary note 13 or 14 wherein:

the image feature extraction means extracts the image feature by classifying each pixel of the person's image to N number of bins, N being an integer equal to or larger than 2; and the weight application means calculates a value $b_{jn}$ of an n-th bin of the feature which has been weighted using the weight image of the human body part j using the following expression:

$$b_{jn} = \sum_x \sum_y w_{jxy} \varepsilon_{nxy} \quad \text{[Expression 4]}$$

where J is the number of human body parts for which the existence probability is estimated, j is an integer from 1 to J, x and y are positions of the pixels in the person's image, n is an integer from 1 to N, $w_{jxy}$ is a weight of the human body part j in the pixel (x, y), and $\varepsilon_{nxy}$ is 1 when the pixel (x, y) of the person region image is voted for the n-th bin and is 0 when the pixel (x, y) of the person region image is not voted for the n-th bin.

(Supplementary Note 16)

The person verification device described in Supplementary note 15, wherein the weight application means creates the feature for verification by integrating values $b_{1n}$ to $b_{Jn}$ of the n-th bin weighted using the weight images of the human body parts 1 to J.

(Supplementary Note 17)

The person verification device described in Supplementary note 16, wherein the weight application means integrates the values $b_{1n}$ to $b_{Jn}$ of the n-th bin by:

joining the values $b_{1n}$ to $b_{Jn}$ of the n-th bin in a one-dimensional vector and taking the maximum or the minimum value of the values $b_{1n}$ to $b_{Jn}$ of the n-th bin; or joining the values $b_{1n}$ to $b_{Jn}$ of the n-th bin using a coefficient in accordance with the human body part j.

(Supplementary Note 18)

A person verification method comprising:

estimating, from a person's image in which a person is included, a weight of a human body part of the person in accordance with an existence probability of the human body part;

creating a feature for verification based on the person's image and the estimated weight;

comparing the created feature for verification and a verification feature stored in a verification feature storage means; and outputting a result of the comparison.

(Supplementary Note 19)

The person verification method described in Supplementary note 18, wherein in the estimation of the weight, the existence probability of the human body part is estimated for each pixel of the person's image, and a weight image indicating the weight is created based on the estimated existence probability.

(Supplementary Note 20)

A non-transitory computer readable medium configured to store a program for causing a computer to perform processing of:

estimating, from a person's image in which a person is included, a weight of a human body part of the person in accordance with an existence probability of the human body;

creating a feature for verification based on the person's image and the estimated weight;

comparing the created feature for verification and a verification feature stored in a verification feature storage means; and outputting a result of the comparison.

(Supplementary Note 21)

The non-transitory computer readable medium described in Supplementary note 20, wherein the processing of estimating the weight comprises processing of:

estimating the existence probability of the human body part for each pixel of the person's image; and creating a weight image expressing the weight based on the estimated existence probability.

This application is based upon and claims the benefit of priority from Japanese patent application No. 2017-236304, filed on Dec. 8, 2017, the disclosure of which is incorporated herein in its entirety by reference.

REFERENCE SIGNS LIST 10, 100: PERSON VERIFICATION DEVICE
11: WEIGHT ESTIMATION MEANS
12: FEATURE CREATION MEANS
13: VERIFICATION FEATURE STORAGE MEANS
14: PERSON VERIFICATION MEANS
101: INPUT UNIT
110: PERSON'S IMAGE CUT-OUT UNIT
120, 210: WEIGHT ESTIMATION UNIT
121, 211: PART EXISTENCE PROBABILITY ESTIMATION UNIT
122, 212: WEIGHT IMAGE CREATION UNIT
130: FEATURE CREATION UNIT
131, 221: IMAGE INTEGRATION UNIT
132: FEATURE EXTRACTION UNIT
133: IMAGE FEATURE EXTRACTION UNIT
134: WEIGHT APPLICATION UNIT
140: VERIFICATION FEATURE DATABASE
150: PERSON VERIFICATION UNIT
160: OUPUT UNIT
200: FEATURE LEARNING DEVICE
220: FEATURE LEARNING UNIT
222: LEARNING UNIT
230: TRAINING IMAGE DATABASE
300: CONVOLUTIONAL NEURAL NETWORK
301: INPUT LAYER
302: INTERMEDIATE LAYER
303: OUTPUT LAYER
310, 311: NODE
312: EDGE

The invention claimed is:

1. A person verification device comprising:
at least one memory configured to store instructions; and
at least one processor configured to execute the instructions to:
estimate, from a person's image in which a person is included, a weight of a human body part of the person in accordance with an existence probability of the human body part;
create a feature for verification by applying the person's image and the estimated weight to a convolutional neural network; and
compare the created feature for verification and a verification feature.

2. The person verification device according to claim 1, wherein the at least one processor is further configured to execute the instructions to extract an intermediate feature of the convolutional neural network as the feature for verification.

3. The person verification device according to claim 1, wherein:
the convolutional neural network comprises an input layer, an intermediate layer, and an output layer that each include a plurality of nodes; and
the at least one processor is further configured to execute the instructions to extract an output value of each node in a layer one before the output layer as the feature for verification.

4. The person verification device according to claim 1, wherein the at least one processor is further configured to execute the instructions to:
estimate an existence probability of the human body part for each of a plurality of pixels of the person's image; and
create a weight image expressing the weight based on the estimated existence probability.

5. The person verification device according to claim 4, wherein the at least one processor is further configured to execute the instructions to estimate the existence probability of the human body part for each of a plurality of human body parts and create the weight image for each of the plurality of human body parts.

6. The person verification device according to claim 5, wherein the at least one processor is further configured to execute the instructions to normalize the existence probability estimated for each human body part using maximum and minimum values of the probability of the plurality of human body parts and create the weight image based on the normalized existence probability.

7. The person verification device according to claim 5, wherein the at least one processor is further configured to execute the instructions to calculate the weight $w_{jxy}$ for a j-th body part at position (x, y) in an image using:

$$w_{jxy} = \frac{p_{jxy} - \min(P)}{\max(P) - \min(P)}$$

where J is a number of the human body parts for which the existence probability is estimated, j is an integer of from 1 to J, max(P) is a maximum value of the existence probability of the plurality of human body parts, and min(P) is a minimum value of the existence probability of the plurality of human body parts.

8. The person verification device according to claim 1, wherein the convolutional neural network is learned by a learning device.

9. The person verification device according to claim 8, wherein the learning device comprises at least one memory configured to store instructions and at least one processor configured to execute the instructions to:

learn the convolutional neural network by applying a training image to which a label indicating a person included in the training image is assigned and a training weight image created from the training image to the convolutional neural network so that an output of the convolutional neural network becomes the label.

10. A person verification method comprising:
estimating, by a processor and from a person's image in which a person is included, a weight of a human body part of the person in accordance with an existence probability of the human body part;
creating, by the processor, a feature for verification by applying the person's image and the estimated weight to a convolutional neural network;
comparing, by the processor, the created feature for verification and a verification feature; and
outputting, by the processor, a result of the comparison.

11. A non-transitory computer readable medium configured to store a program for causing a computer to perform processing of:
estimating, from a person's image in which a person is included, a weight of a human body part of the person in accordance with an existence probability of the human body;
creating a feature for verification by applying the person's image and the estimated weight to a convolutional neural network;
comparing the created feature for verification and a verification feature; and
outputting a result of the comparison.

* * * * *